Aug. 27, 1963 M. J. H. STAAR 3,101,951

PHONOGRAPH ARMS FOR RECORDING APPARATUS

Filed Aug. 28, 1961

United States Patent Office 3,101,951

Patented Aug. 27, 1963

3,101,951

PHONOGRAPH ARMS FOR RECORDING APPARATUS

Marcel Jules Hélène Staar, 4 Ave. Sylviane, Rhode-Saint-Genese, Belgium

Filed Aug. 28, 1961, Ser. No. 134,439
Claims priority, application Belgium Aug. 29, 1960
3 Claims. (Cl. 274—23)

Figure 1:
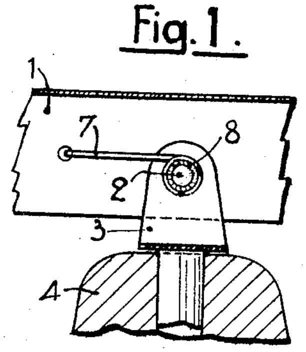

My present invention relates to phonograph arms for gramaphones and recording apparatus having a rotating turntable, and more especially to the pivotal support of these arms.

The recording of micro-groove records and especially of stereophonic records necessitates a vertical pressure of the needle on the record of only a few grams and, for that reason, a vertical pivoting, which is as free as possible, of the pick-up arm is necessary.

The need for the obtaining of substantially perfect pivoting is accentuated by virtue of the reduced vertical pressure of the needle in the groove of the record.

In known embodiments, the weight of the arm is compensated for either by a counterweight on the end of the arm remote from the needle (this is the case of more costly arms) or by a spring arranged horizontally in the phonograph arm and fixed at one end to a support for the arm and fixed at the other end to the arm at a location between the support and the needle. Alternately the spring may extend vertically between the arm and the support at a location on the arm adjacent the support on a side thereof opposite that of the needle.

The springs upon the emission of certain mechanical vibrations of the pick-up arm and of certain sounds produced by the reproducing apparatus give rise to parasitic vibrations which adversely influences the reproduction.

To avoid the above disadvantage, it is known to provide a torsion spring around a horizontally disposed axle about which the arm pivots, which spring engages both the phonograph arm and the support therefor to resist pivotal movement of the arm with respect to the support about said axle. The spring is in contact with the axle and as a result thereof there is produced frictional forces which are related to the magnitude of the contact forces between the turns of the spring and the axle. This is particularly apparent for the turns of the spring adjacent the end of the spring which engages the arm.

These frictional forces which are developed prevent proper pivoting of the arm and constitute a disturbing effect against proper recording on a record by virtue of the irregular vertical pressure of the arm.

It is an object of the invention to provide an improved elastic support for a phonograph arm wherein the arm has substantially free pivotal movement about a horizontal axis and wherein frictional forces are substantially reduced.

It is another object of the invention to overcome the disadvantages associated with torsion springs and to eliminate parasitic vibrations of the arm developed thereby.

In accordance with the invention, the phonograph arm is supported on a pivoting axle and a torsion spring is wound around the axle. A sleeve made of material made of a low co-efficient of friction is interposed between the torsion spring and the pivoting axle, thereby to substantially minimize the frictional forces developed between the axle and the spring.

Preferably, the sleeve extends along only part of the length of the axle and in a zone corresponding to turns of the spring which are adjacent the end thereof which engages the arm.

Figure 2:
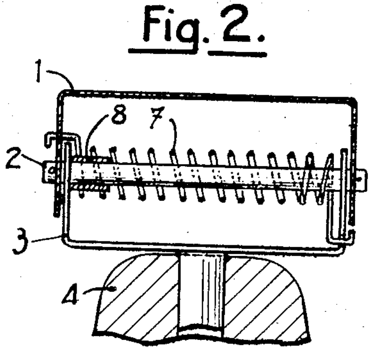

The invention is illustrated by way of example in the appended drawing wherein:

FIG. 1 shows in a side sectional view a portion of a phonograph arm and the support therefor; and FIG. 2 shows in end sectional view a portion of the phonograph arm and the support therefor.

There is shown an arm 1 which is supported on a base 3 which is rotatably supported in a support 4 for angular movement about a substantially vertical axis. The arm 1 is supported from the base 3 by pivot axle 2 and as a consequence thereof, the arm is free to pivot with respect to base 3 about the pivot axle. A spring 7 is wound around the axle 2 and the spring is connected at one end to the arm 1 and at the other end to the base 3 such that a torsional force is developed between the arm and base which resists the torsional force developed by the weight of the arm around the axle 2.

Interposed between the spring 7 and the axle 2 is a sleeve 8 which is constructed from material having a low coefficient of friction as, for example, nylon. The sleeve 8 extends between the axle 2 and the spring 7, preferably in a zone adjacent the connection of the spring to the arm and as shown in FIG. 2.

By judiciously fixing the length of the sleeve to correspond to the aforementioned zone, the major source of friction between the spring and the axle is eliminated, thereby eliminating parasitic vibrations.

It is thus possible to produce a very free vertical pivoting support of the arm from the base such that a recording operation may be made on discs with irregular surfaces while insulating the recording from parasitic vibrations produced by the tension spring which is provided between the arm and the base.

It will be obvious to those skilled in the art to modify and vary the disclosed apparatus in the invention without departing from the spirit of the following claims.

What I claim is:

1. In a gramophone, a device for the vertical pivoting of a phonograph arm, the said device comprising a pivoting axle for the arm, a torsion spring wound round the said axle and a sleeve made of material having a low coefficient of fraction and interposed between the torsion spring and the pivoting axle.

2. In a gramophone, a device for the vertical pivoting of a phonograph arm, the said device comprising a pivoting axle for the arm, a torsion spring wound round the said axle and having an end engaging said arm and a sleeve made of material having a low coefficient of friction and interposed between the torsion spring and the pivoting axle said sleeve extending for only part of the length of the axle and in a zone corresponding to turns of the spring adjacent the end thereof engaging the arm.

3. A device according to claim 1 in which the material having a low coefficient of friction is nylon.

References Cited in the file of this patent

UNITED STATES PATENTS

| | | |
|---|---|---|
| 1,846,871 | Hutter | Feb. 23, 1932 |
| 2,882,059 | Da Costa | Apr. 14, 1959 |